June 23, 1953
J. S. POWELL, JR
2,642,738
APPARATUS FOR MEASURING THE
SPECIFIC GRAVITY OF A GAS
Filed Jan. 11, 1947
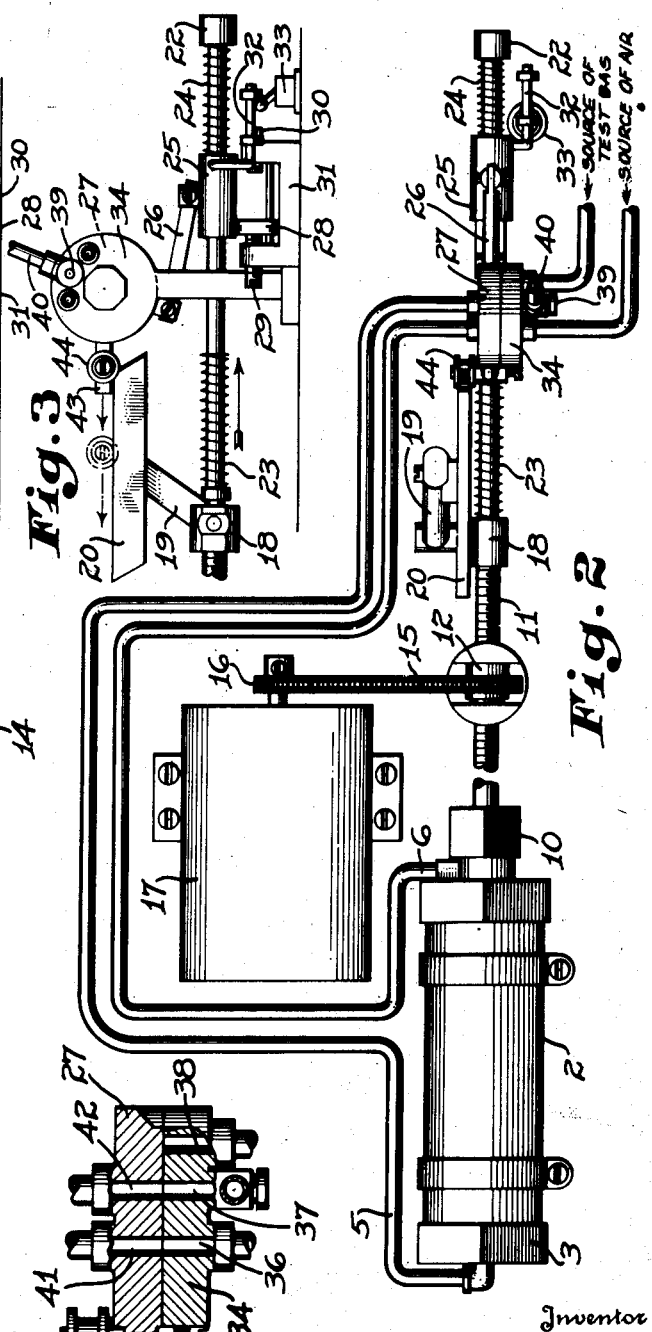
Inventor
Jonathan S. Powell, Jr.,
By Lyon & Lyon
Attorneys Patented June 23, 1953

2,642,738

UNITED STATES PATENT OFFICE 2,642,738

APPARATUS FOR MEASURING THE SPECIFIC GRAVITY OF A GAS

Jonathan S. Powell, Jr., South Pasadena, Calif.

Application January 11, 1947, Serial No. 721,639

4 Claims. (Cl. 73—30)

This invention relates to an apparatus for measuring the specific gravity or density of a gas.

The general object of the present invention is to provide a device which may measure automatically and continuously the gravity of a gas.

Another object of the present invention is to provide a method by means of which the gravity or density of the gas may be continuously recorded.

The apparatus of the present invention determines the gravity or density of the gas from the measurement of the pressure of the gas when flowing at a constant predetermined rate through an orifice.

The apparatus of the present invention is preferably arranged for alternately causing a constant flow at a predetermined rate of air and gas through the same orifice while measuring the pressure of the gas at the orifice and the pressure of the air at the orifice. The specific gravity of the gas being measured is, therefore, directly proportional to the ratio of the pressure on the gas and the pressure on the air when each are flowing at the same rate through the same orifice.

To provide for the desired constant and equal flow of gas and air through the same orifice, there is provided in the apparatus of the present invention a piston operating in a cylinder and into the said cylinder on the opposite sides thereof are drawn the air and the gas. The piston is given a reciprocating movement and driven in both directions at a predetermined speed. By driving the piston at constant speed the rate of flow of the air and gas during the alternate cycles is equal and constant. A reversing valve mecchanism is provided, by means of which the air and gas pumped from the cylinder are alternately forced through the same orifice. As a further element, the apparatus of the present invention has a means for automatically driving the piston by a synchronous motor and means for reversing the drive of the piston, changing the position of the valve in order to effect an alternating measurement of the pressure of the gas and the air required to force the same at the predetermined rate through the orifice.

The apparatus of the present invention will be more fully understood from the following description of the preferred form of the apparatus. A preferred form or example of an apparatus embodying the invention is therefore described in connection with the accompanying drawings, in which Figure 1 is a side elevation, slightly in section.

Figure 2 is a plan view.

Figure 3 is a fragmentary elevation, showing a second operating position.

Figure 4 is a fragmentary section through the valve means.

Referring to the drawings, the apparatus of the present invention comprises a cylinder 2 closed at its end by casing members 3 and 4 from which lead the gas lines 5 and 6. Within the cylinder 2 is provided the piston member 7 which has any usual or preferred type of packing cups 8 for forming a substantially airtight seal with the walls of the piston 2. The piston 7 is mounted upon a rod 9 which extends through the stuffing box 10. Exteriorly of the stuffing box the rod 9 is threaded, as indicated at 11.

A nut 12, threaded to the shaft 9, is positioned between the arms of a bracket 14 which restrains the axial movement of the nut. The nut 12 is provided with a sprocket on its exterior, by means of which it is driven by a chain 15 from a sprocket wheel 16 of a synchronous electric motor 17. The operation of the motor 17 thus moves the rod 9 and thereby the piston 7. Since the synchronous motor operates at a constant speed, the linear travel of the piston 7 is constant and as a result of this movement there is therefore a fixed volume of air forced out of one end of the cylinder while the air and gas, as hereafter explained, is drawn in at the opposite end of the cylinder.

Beyond the threaded portion of the rod 9 there is provided the fixed collar member 18 to which is attached the arms 19 mounting the trapezoid cam 20. Beyond the collar member 18 a smooth section 21 of the piston rod 9 is secured to a second collar 22. A coil spring 23 is positioned on the section 21 of the rod 9 with one end against the collar 18 and a second coil spring 24 is likewise mounted on the smooth section 21 of the rod with one end against the collar 22.

Positioned between the two springs 23 and 24 is a follower member 25 slidably mounted on the section 21 of the rod 9 and pivotally connected to an arm 26, the opposite end of which is pivotally attached to a valve member 27. The follower member 25 is provided with an arm 28 which is positioned between two adjustable stops 29 and 30 mounted by a bracket 31. There is also provided a switch actuating arm 32 mounted on the follower 25 for actuating a switch 33. The switch 33 may be of any usual or preferred form for reversing the direction of current applied to the synchronous motor 17 whereby the operations of the switch 33, as hereafter described, are capable of effecting the reversal of the direction of rotation of the synchronous motor 17. The valve member 27 is rotatably mounted by a second valve member 34 and fixed to a standard 35. The fixed valve member 34 is provided with three openings 36, 37 and 38 which are respectively connected to a source of air (not shown), discharge orifice 39, and a source of gas to be measured (not shown). Associated with the discharge orifice 39 is provided the pressure gauge tubelature 40. The gauge is preferably of the automatic recording type.

The movable valve member 27 is provided with two passages 41 and 42 which are, respectively, connected to lines 5 and 6 leading to the cylinder 2 at the opposite sides of the piston 7.

The valve formed by the members 27 and 34 is movable from a position such as indicated in Fig. 4, where the openings 36 and 37 of the stationary valve member 34 are in respective communication with the passages 41 and 42 and in which the passage 38 in the member 34 is closed, to a second position in which passage 36 in member 34 is closed and passage 37 in member 34 is connected to passage 41 of member 27, and passage 38 of member 34 is connected to passage 42 of member 27. The passages 41 and 42 are offset equal distances from the axis of rotation of the valve member 27, and the passages 36, 37 and 38 are likewise offset the same distance from said axis. Moreover, the circumferential spacing between passages 41 and 42, and between the passages 36 and 37 and the passages 37 and 38, are all equal, so as to allow the rotation of the valve member 27 to operate in connecting the passages as above described.

The movable cam member 27 is also provided with an arm 43 mounting a roller in engagement with the trapezoid cam 20.

The operation of the apparatus of the present invention is as follows and occurs in continuous alternating cycles. In the first cycle of operations, for example, the motor 17 may drive the rod 9 to the left, as viewed in Fig. 1. This forces the gas, the density or specific gravity of which is to be measured, out of the line 5 at a predetermined rate through the passage 42 of the movable valve member 27 through the passage 37 in the fixed valve member 34 (Fig. 4) out through the orifice 39. During this operation, the pressure developed is recorded by a recording gauge connected to tubelature 40. During this cycle, air is taken from the source through passages 36 and 41 of the valve through line 6 into the right-hand side of the cylinder. As the rod moves to the left, as viewed in Fig. 1, the left end of spring 24 comes in contact with follower 25. Since the movement of follower 25 is prevented until the end of the cycle (as hereafter described) the spring 24 is continuously compressed to the end of this cycle. During this operation the movement of the follower 25 is prevented by arm 26 attached to the movable valve member 27 since the movable valve member 27 is prevented from rotating by contact of its roller 44 with the underside of the trapezoid cam 20. As the movement of the rod 9 continues to the left, as viewed in Fig. 1, continuously increasing the spring tension developed tending to urge the movable valve member 27 clockwise, at the end of the intended cycle of movement, the roller 44 comes to the end of the underside of the trapezoid cam 20, allowing rotation of the valve member 27 to release the follower 25 which is snapped over against the stop 29. The position of switch 33 is reversed, reversing the direction of rotation of the motor 7 so that the rod 9 now starts to move at a predetermined speed to the right, as viewed in the figure. As the rod moves to the right gas is now taken through passages 38 and 42 and line 5 and enters the cylinder to the left of the piston 7 at the same time the air, which has been drawn into the cylinder to the right of the piston, is forced out through the line 6 and through passages 41 and 37 of the valve to flow through the orifice 39 and the pressure required recorded by the recording gauge. As the motion to the right continues, the right end of spring 23 comes into contact with the follower 25 and spring 23 is progressively compressed. Spring 23 places a tension urging a counter-clockwise rotation of the valve member 27. This motion is prevented by contact of roller 44 with the upper side of the trapezoid cam 20 until the roller 44 rolls off the left end of the cam 20 at the end of the movement of the rod 9 to the left. The valve 27 will, under the influence of spring 23, snap rapidly to the original position, and the cycle repeated.

Since in the measuring process there is an immediate comparison made between the action of the gas to be measured and air, the apparatus of the present invention permits the immediate and direct determination of the specific gravity of the gas and is free from many sources of error which might otherwise arise from irregularities either in the size of the orifice, design of the pressure gauge or recording apparatus, or even irregularities over a period of time in the operation of the motor driving the apparatus. Moreover, since both air and gas are taken into the same cylinder and passed through the same orifice they are brought to the same temperature and there is, therefore, no necessity for providing any corrections based on temperature or on the physical characteristics of the orifice.

While the particular form of the apparatus herein describes simply and directly continuous measurement of the specific gravity or density of gas, it is to be understood that various modifications of the apparatus may be made, and this invention includes all such alterations and changes as come within the scope of the appended claims.

I claim:

1. An apparatus for measuring the specific gravity of a gas, which comprises an orifice, a cylinder, a piston movable in said cylinder, means for alternately introducing air into one side of said cylinder and discharging the air therefrom while alternately discharging gas to be measured from the other side of said cylinder and introducing the gas thereto, means for alternately connecting the same said orifice with the discharged air and gas, a pressure gauge for measuring the pressure at said orifice, and means for alternately driving said piston at predetermined constant linear rates said means including a rod connected to said piston having a threaded portion and a synchronous motor rotating a member threaded thereto, whereby the piston may be driven at a constant linear speed, and means for reversing said motor.

2. An apparatus for measuring the gravity of a gas which includes a valve, a cylinder having a piston moving therein, lines leading from said valve to said cylinder at opposite sides of said piston, air and gas inlet lines leading to said valve and an orifice connected to said valve, said valve being movable alternately into one position in which the air supply line is cut off and one of the lines from said cylinder to said valve is connected to said orifice, while the other line from said cylinder to said valve is connected to said gas inlet line and into a second position in which the gas inlet line is shut off, and the first mentioned line from the cylinder to the valve is connected to said air inlet line, while the second mentioned line from the cylinder to the valve is connected to said orifice, means for driving said piston alternately through alternate cycles at constant linear speed, and means operating for reversing the position of said valve under the direction and movement of said driving means at the end of the cycle of operation.

3. An apparatus for measuring the gravity of a gas comprising a reversible synchronous motor, drive means from said motor for axially moving a piston rod at a constant linear speed, a piston mounted on said rod and movable in a cylinder, valve-actuating means operated by said rod and switch-actuated means operated by said rod at the end of the intended movement of said rod, said valve-switch operating means reversing the direction of movement of said reversible synchronous motor, a reversing valve, said valve-actuating means reversing the position of the reversing valve, a line from each end of said cylinder to a passage in said reversing valve, an orifice connected to a passage in said reversing valve and an air inlet and a gas inlet connected to passages in said reversing apparatus, the passages of said reversing valve connected to the lines from said cylinder being movable relative to the other passages to allow for alternate flow and discharge of air and gas to and from the opposite sides of said cylinder and hence to said orifice, and means for registering the pressure of gas flowing through said orifice.

4. An apparatus for measuring the gravity of a gas comprising a reversible synchronous motor, drive means from said motor for axially moving a piston rod at constant linear speed, a piston mounted on said rod and movable in a cylinder, valve-actuating means operated by said rod and switch-actuating means operated by said rod at the end of the intended movement of said rod, said valve-switch operating means reversing the direction of movement of said reversible synchronous motor, a reversing valve, said valve-actuating means reversing the position of the reversing valve, a line from each end of said cylinder to a passage in said reversing valve, an orifice connected to a passage in said reversing valve and an air inlet and a gas inlet connected to passages in said reversing apparatus, the passages of said reversing valve connected to the lines from said cylinder being movable relative to the other passages to allow for alternate flow and discharge of air and gas to and from the opposite sides of said cylinder and hence to said orifice, and means for registering the pressure of gas flowing through said orifice, the said latter means comprising a recording meter.

JONATHAN S. POWELL, Jr.

References Cited in the file of this patent

UNITED STATES PATENTS

| Number | Name | Date |
| --- | --- | --- |
| 1,944,247 | Smith | Dec. 21, 1909 |
| 1,354,681 | Okey | Oct. 5, 1920 |
| 1,577,395 | Welch | Mar. 16, 1926 |
| 1,829,789 | Dammeyer | Nov. 3, 1931 |
| 1,945,660 | Scott | Feb. 6, 1934 |
| 1,962,861 | Ericson | June 12, 1934 |
| 2,459,483 | Zimmer et al. | Jan. 18, 1949 |

FOREIGN PATENTS

| Number | Country | Date |
| --- | --- | --- |
| 268,352 | Germany | Apr. 16, 1912 |
| 148,575 | Great Britain | July 21, 1921 |
| 114,366 | Austria | Dec. 9, 1941 |